Feb. 22, 1949. E. G. GUNN 2,462,488
CONTROL PLATE FOR FILTER CARTRIDGES
Filed June 7, 1945

INVENTOR
Earl G. Gunn
BY Barlow & Barlow
ATTORNEYS

Patented Feb. 22, 1949

2,462,488

UNITED STATES PATENT OFFICE 2,462,488

CONTROL PLATE FOR FILTER CARTRIDGES

Earl G. Gunn, Providence, R. I., assignor to Fram Corporation, a corporation of Rhode Island Application June 7, 1945, Serial No. 598,138

3 Claims. (Cl. 210—62)

1

This invention relates to a filter cartridge, particularly to the manner of flow of liquid to be filtered with reference to the cartridge.

A filter may be installed in the lubricating system of an internal combustion engine, so that the lubricant to be filtered will have an opportunity to by-pass the filtering medium by passing from the unfiltered pressure chamber for the lubricant to the no pressure conduit for the filtrate without passing through the filtering medium. Some control may be exercised of this by-pass, either by valve means or by the size of the opening or conduit through which the unfiltered liquid passes. With the installation of certain other systems of conduction of lubricant to be filtered, the liquid, instead of being by-passed into the filtrate conduit for return to the common reservoir, by-passes the filter medium and passes into the main flow pressure conduit to continue on its way to other parts of the lubricant system and the conduit for the filtrate is not entered by the unfiltered lubricant. This system I refer to as a "shunt" system. Cartridges which are adapted for use in one system would, under ordinary conditions, not be adapted for use in the other system, thus requiring two forms of cartridges of equal size and otherwise duplicates except for the construction which controls the flow of the lubricant which is to be filtered.

One of the objects of this invention is to provide a construction whereby a single cartridge may be adapted for use in either the by-pass or shunt systems, as above pointed out.

Another object of this invention is to provide an arrangement in the by-pass system which will so support the cartridge equipped with this invention that by-pass opening is left free and clear in the cartridge, while an arrangement is provided in the shunt system so that if this same cartridge is used in the shunt system, the support for the cartridge will be of such extent that it will cover the hole which affords a by-pass in the by-pass system, thus preventing flow of lubricant through this by-pass hole and adapting the cartridge for use in the shunt system.

2

Figure 5:
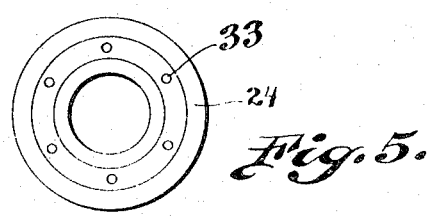

Figure 5 is a bottom plan view of the plate on the lower end of the cartridge.

In proceeding with this invention, I provide in the bottom wall or end plate of the cartridge one of several holes to communicate with the opening through the center of the cartridge. These holes are all of the same radial distance from the central axis of the cartridge so that when I provide a support for the cartridge, having a flat surface at the same radial distance from the axis of the cartridge as the holes, all of the holes will be blocked off, while if I provide a support for the cartridge which will have a flat surface located inwardly from the holes, these holes will be left open or free for the passage of lubricant in by-pass relation to the filter medium. Thus, by the use of this auxiliary plate and the selection of the supports, one to be installed upon the filter case which is connected in the shunt system and the other to be utilized in a filter case which is connected in the by-pass system, I may utilize a single cartridge to obtain both results.

With reference to the drawings, I have illustrated a filter casing 10, having an inlet opening 11 for the passage of lubricant upwardly through the standpipe 12, to the upper end of the filter cartridge, which is designated generally 13. This lubricant may pass outwardly through the ball valve 14, returning to the pressure conduit or pressure rib of an internal combustion engine through the outlet opening 15, while filtrate or lubricant which is filtered may pass downwardly through the center tube 16 and out the center opening 17, returning to the common reservoir in the sump of the crankcase where the lubricant is contained. This relationship is referred to as the shunt system of flow or filtration.

Figure 3:
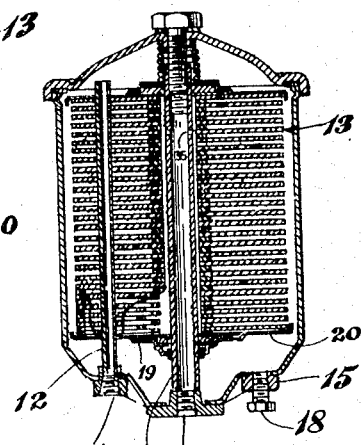
Figure 3 is a sectional view of a filter connected in the by-pass system.

In the case which I have shown in Figure 3, no connection is made to the opening 15, but rather a plug 18 is provided, closing off this opening and liquid which enters through the inlet opening 11 must either pass through the filter element 13 or by-pass the same through some by-pass which is provided at 19 in the showing herein and referred to as the by-pass system.

The filter cartridge, designated generally 13, has a bottom plate 20, having an opening 21 therein, which will afford communication through the filter medium, such for instance as through openings 22 to the center opening 23 of the cartridge, through which the center tube 16 extends. An auxiliary plate 24 is offset as at 25 to receive a soft gasket 26, tightly holding the same between the plates 20 and 24 and centering the same by means of the shoulder 25 about openings 27 in the bottom plate and 28 in the auxiliary plate, which openings register with the central opening 23 in the cartridge. This soft washer or gasket 26 serves to form a tight seal between the bottom of the cartridge and the center tube 16. The auxiliary plate 24 is also shouldered as at 30 and has a marginal edge 31 which lies snugly against the bottom plate 20 and is held in this position by fingers 32 cut from the bottom plate and bent over this margin of the auxiliary plate for this purpose. Between the two offset portions of the plate 24 is an annular ring, in which I provide a plurality of holes 33, each the same radial distance from the central axis of the cartridge, which provide communication with the space between the plates radially outwardly from the washer 26 when the openings 33 are uncovered, and which space provides a chamber, designated generally 34. Liquid may pass through these openings 33 into the chamber 34 and then inwardly through the opening 21 in the bottom plate and through the element to the center opening 23 in the cartridge thence upwardly until the opening 35 is reached, where the liquid will enter the center tube and then pass downwardly and out through the bottom opening 17.

Figure 1:
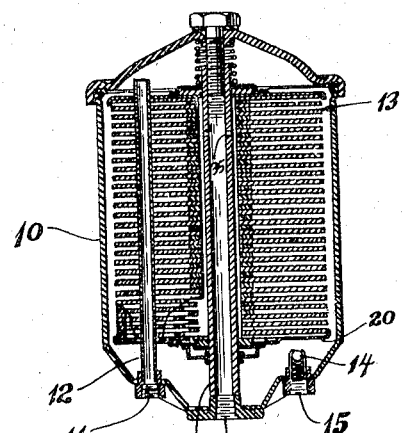
Figure 1 is a sectional view of a filter connected in the shunt system.
Figure 2:
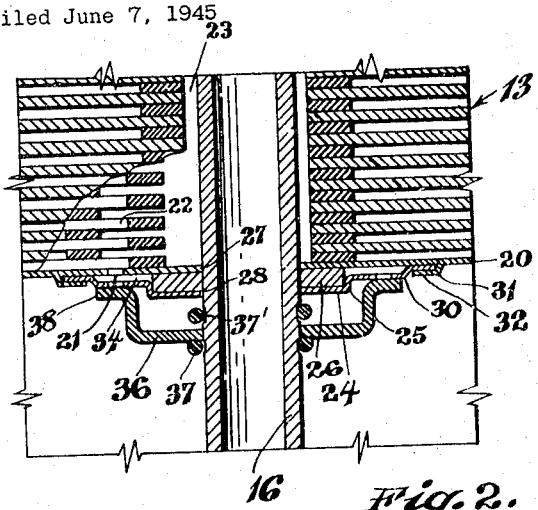
Figure 2 is a sectional view of a fragmental portion of Figure 1 on a larger scale.
Figure 4:
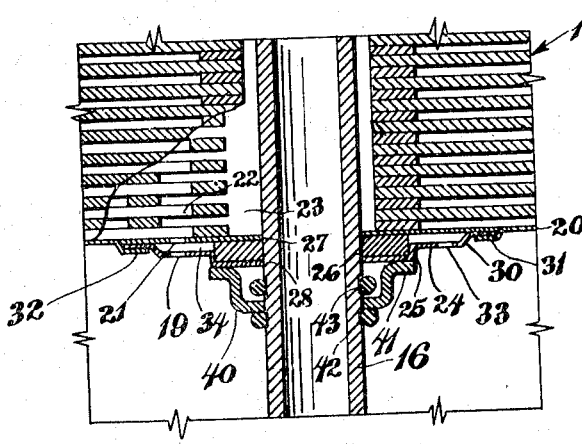
Figure 4 is a sectional view of a fragmental portion of the filter in Figure 3 on a larger scale.

If I desire to use a cartridge 13, equipped with this auxiliary plate as above mentioned, in the shunt system, it is necessary that I block off the holes 33 and accordingly I will provide a support 36 (see Figure 2) secured by some suitable means to the center tube 16, such as by spring rings 37, 37', and this support will be provided with an outwardly extending flange 38, which will be at a radial distance from the central axis of the cartridge and center tube 16 so that when the cartridge rests upon this abutment or flange 38 all of the holes 33 will be covered and blocked off so that lubricant cannot enter these holes, and thus lubricant will pass upwardly through the standpipe 12 across the cartridge and outwardly through the ball valve 14 and opening 15, while only filtrate will enter the center tube 16 through the opening 35 and pass from the filter case downwardly through the center tube.

In case I wish to use this arrangement in a by-pass system, I will provide a support 40 which will have an outwardly extending flange 41 and will be secured to the center tube 16 by any suitable means, such for instance as by spring rings 42 and 43. Flange 41 will be at a radial distance from the center axis of the cartridge and tube 16 so that the auxiliary plate 24 will engage this abutment or support 41 inwardly of the openings 33 and thus leave these openings free and clear so that liquid may pass inwardly through these openings 33, thence through the chamber 34 through the opening 21 in the bottom plate 20 and inwardly through the channels 22 in the cartridge to the center opening 23 and thus join with the filtrate to pass upwardly and inwardly through the hole 35 and downwardly through tube 16 and out opening 17, this latter form being for the use of the cartridge which has been common, while the use of the cartridge in the shunt system is a newer development.

It will be apparent that I may utilize this form of plate for providing a cartridge which may be used in either of the two systems in which it is desired.

The function of the auxiliary plate 24 is to provide a plurality of openings 33 so that should one become blocked others may still function to feed the opening 21 in the bottom plate 20. From the standpoint of operation, a single opening 21 in the bottom plate with an absence of the auxiliary plate will function properly, it being merely a matter of closing this by-pass opening 21 alone to block the communication provided for by-passing.

I claim:

1. A filter element comprising a filter medium having a central axial opening, a bottom plate having a hole which communicates through said medium to said opening, an auxiliary plate spaced from the bottom plate and provided with a hole which communicates through the space between said plates with the said hole in the bottom plate, said auxiliary plate providing a first surface about said hole therein at one radial distance from said axial opening to engage by face to face contact an abutment located in a filter case to block passage through said hole and said auxiliary plate also providing a second surface located radially inwardly of said first surface to engage a different abutment in a filter case to expose said hole for passage of liquid therebetween when so engaged.

2. A filter element as set forth in claim 1, wherein said plates have central openings registering with the central opening in said medium and a soft gasket is provided between said plates about said registering openings to engage a center tube of a filter case and provide a seal therewith.

3. A filter element as set forth in claim 1, wherein said auxiliary plate is provided with a plurality of holes all located substantially the same radial distance from the central axis of the filter element.

EARL G. GUNN.

REFERENCES CITED

The following references are of record in the file of this patent:

UNITED STATES PATENTS

| Number | Name | Date |
|---|---|---|
| 1,401,976 | Giovannoni | Jan. 3, 1922 |
| 1,663,322 | Tekavec | Mar. 20, 1928 |
| 1,758,284 | Gronning | May 13, 1930 |
| 1,771,928 | Jung | July 29, 1930 |
| 2,225,813 | Williams | Dec. 24, 1940 |
| 2,271,054 | Williams | Jan. 27, 1942 |

FOREIGN PATENTS

| Number | Country | Date |
|---|---|---|
| 293,745 | Great Britain | 1929 |